United States Patent
Werhahn et al.

(10) Patent No.: US 11,377,003 B2
(45) Date of Patent: Jul. 5, 2022

(54) SUSPENSION SYSTEM, PREFERABLY DRIVER SEAT

(71) Applicant: ContiTech Vibration Control GmbH, Hannover (DE)

(72) Inventors: Max Werhahn, Hannover (DE); Peter Marienfeld, Marklohe (DE)

(73) Assignee: ContiTech Vibration Control GmbH, Hannover (DE)

( * ) Notice: Subject to any disclaimer, the term of this patent is extended or adjusted under 35 U.S.C. 154(b) by 357 days.

(21) Appl. No.: 16/603,014

(22) PCT Filed: Feb. 5, 2018

(86) PCT No.: PCT/EP2018/052753
§ 371 (c)(1),
(2) Date: Oct. 4, 2019

(87) PCT Pub. No.: WO2018/184752
PCT Pub. Date: Oct. 11, 2018

(65) Prior Publication Data
US 2020/0031256 A1    Jan. 30, 2020

(30) Foreign Application Priority Data
Apr. 6, 2017    (DE) .................... 10 2017 205 902.8

(51) Int. Cl.
*B60N 2/00*    (2006.01)
*B60N 2/50*    (2006.01)
(Continued)

(52) U.S. Cl.
CPC .......... *B60N 2/501* (2013.01); *B60N 2/0232* (2013.01); *B60N 2/0244* (2013.01); *B60N 2/162* (2013.01);
(Continued)

(58) Field of Classification Search
None
See application file for complete search history.

(56) References Cited

U.S. PATENT DOCUMENTS

| 4,198,025 A | 4/1980 | Lowe et al. |
| 4,382,573 A * | 5/1983 | Aondetto ............... B60N 2/072 248/561 |

(Continued)

FOREIGN PATENT DOCUMENTS

| DE | 2707184 A1 | 8/1978 |
| DE | 102013110927 A1 | 4/2015 |

(Continued)

OTHER PUBLICATIONS

Search Report dated May 30, 2018 of International Application PCT/EP2018/052753 on which this application is based.

*Primary Examiner* — Steven M Marsh
(74) *Attorney, Agent, or Firm* — Gregory Adams; David L. Cate (57) ABSTRACT

The invention relates to a suspension system (1), preferably a driver seat (1), comprising a first suspension part (10), preferably a frame (10) of the driver seat (1); a second suspension part (11), preferably a seat surface (11) of the driver seat (1), wherein the two suspension parts (10, 11) are movable relative to each other in at least one first spatial direction (Z), preferably in the vertical direction (Z); a kinematic system (12), preferably a scissor kinematic system (12) which is designed to connect the two suspension parts (10, 11) in a movable manner relative to each other at least in the first spatial direction (Z); a suspension device (13) which is designed to support the static load of the second suspension part (11); and an actuator (2) which is designed to introduce a force bidirectionally between the two suspension parts (10, 11) and thereby actively damp the relative movement between the two suspension parts (10, (Continued)

11). The suspension system (1) is characterized in that the actuator (2) has a bearing (28), preferably a ball bearing (28), which is arranged within the power flow between the two suspension parts (10, 11) such that an axial load can be kept away from the driven axle of the actuator (2) at least partly, preferably completely.

16 Claims, 5 Drawing Sheets

(51) Int. Cl.
  *B60N 2/02* (2006.01)
  *B60N 2/16* (2006.01)
  *B60N 2/52* (2006.01)
(52) U.S. Cl.
  CPC ............ *B60N 2/164* (2013.01); *B60N 2/502* (2013.01); *B60N 2/505* (2013.01); *B60N 2/508* (2013.01); *B60N 2/525* (2013.01)

(56) References Cited

U.S. PATENT DOCUMENTS

| | | | |
|---|---|---|---|
| 6,120,082 A * | 9/2000 | Vandermolen | B60N 2/02 248/550 |
| 8,585,004 B1 * | 11/2013 | Roeglin | F16M 11/18 248/421 |
| 2006/0237885 A1 | 10/2006 | Bruno et al. | |
| 2006/0278805 A1 * | 12/2006 | Haller | B60N 2/502 248/588 |
| 2011/0284713 A1 * | 11/2011 | Ellerich | B60N 2/52 248/421 |
| 2015/0232004 A1 * | 8/2015 | Haller | B60N 2/164 248/562 |
| 2015/0232005 A1 | 8/2015 | Erwin et al. | |
| 2016/0082870 A1 * | 3/2016 | Fujita | B60N 2/54 248/561 |
| 2016/0207430 A1 | 7/2016 | Erwin et al. | |

FOREIGN PATENT DOCUMENTS

| | | |
|---|---|---|
| EP | 0002332 A1 | 6/1979 |
| EP | 2921342 A2 | 9/2015 |

* cited by examiner

SUSPENSION SYSTEM, PREFERABLY DRIVER SEAT

The present invention relates to a suspension system, preferably a driver's seat, as claimed in the preamble of patent claim 1 and also to a vehicle comprising a suspension system of this kind as claimed in patent claim 15.

An extremely wide variety of applications in which vibrations between a stationary suspension part and a suspension part which is movable relative to said stationary suspension part have to be damped are known in the field of vibration damping. These applications include the driver's seats in some vehicles, such as, for example, in trucks, in buses etc. In this case, vibrations which can be introduced into the vehicle from the carriageway should usually be kept away from the driver by means of damping of the driver's seat in order to protect the driver specifically during relatively long journeys. This is intended not only to increase the comfort of the driver, specifically during relatively long journeys, but rather also protect the health of said driver and also increase the endurance, which can benefit safety, in this way.

In the case of a driver's seat, the stationary suspension part, as the suspension bottom part, is a seat frame which is rigidly connected to the body of the vehicle in the main excitation direction of the vibration, that is to say usually in the height direction. The movable suspension part, as the suspension top part, is the seat surface of the driver's seat which is movable in a vibratory manner in the height direction relative to the seat frame.

EP 2 921 342 A2 describes an apparatus for cushioning a suspension top part in at least one spatial direction in relation to a suspension bottom part which can move relative to said suspension top part and which can be employed, for example, in a vehicle seat. The apparatus has, for cushioning purposes, a spring device in the form of a shock absorber which acts between the suspension top part and the suspension bottom part. An actuating element is provided, by way of which a force can be bidirectionally introduced into the apparatus in the active direction of the spring device. The actuating element can be actuated by means of a control device.

The actuating element has a drive, which is designed as a rotating field magnet, and a coupling rod, which is designed as a ball screw and can be driven by the drive. The drive is fixedly arranged on the suspension top part or on the suspension bottom part and the coupling rod is arranged on a floating bearing cross connection, or vice versa. The coupling rod is designed as a spring-action coupling rod having at least one spring element. The spring device has a spring which is arranged between the suspension top part and the suspension bottom part and has a scissor-type device which connects the suspension top part to the suspension bottom part such that they can move in relation to one another. At least one motion sensor is further provided, with which the movements in the at least one spatial direction of the suspension top part in relation to the suspension bottom part, which movements can be passed on to the control device, can be determined. Furthermore, an acceleration sensor is provided, with which accelerations between the spring top part and the spring bottom part, which movements can be passed on to the control device, can be established.

By means of this apparatus, it is possible to bidirectionally realize active regulation in the active direction of the spring device by means of the actuating element, so that the actuating element firstly can make adjustments in the event of temporary deviations in the distance between the suspension bottom side and the suspension top side and secondly can actively intervene in the vibration isolation. This can increase the comfort of the driver, for example, when the apparatus of EP 2 921 342 A2 is used in a vehicle seat.

However, one disadvantage here is that a particular actuating element, specifically a drive which is designed as a rotating field magnet and has a coupling rod which is designed as a ball screw, is required for implementing the apparatus of EP 2 921 342 A2. This limits the implementation of the apparatus of EP 2 921 342 A2 to this actuating element which is not a standardized drive and therefore can lead to higher costs than a standardized drive.

A further disadvantage is that high axial loads are always transmitted by means of the actuating element for structural reasons, and this can lead to high mechanical loading of the actuating element. This can lead to a reduced service life of the actuating element. Capitalizing on the advantages of the apparatus of EP 2 921 342 A2 can further be interrupted owing to the breakdown of the actuating element, and this can reduce the comfort of the driver for example. The replacement of a broken-down actuating element can also lead to interruption in use and also to material and assembly costs. If the service life of the actuating element should nevertheless be further increased, the actuating element would have to be configured to be more solid in order to be able to withstand the high axial loads for a longer period of time. However, this would lead to increased costs, to an increased space requirement and also to an increased weight, each of which would be disadvantageous.

Another disadvantage is that the actuating element of the apparatus of EP 2 921 342 A2 has a non-linear characteristic of the rotation speed in relation to the travel. This can lead to a non-linear dependency between the constant rotation speed of the actuating element and the resulting travel, and this would cause non-linear control or regulation which can lead to poorer results than a linear relationship.

An object of the present invention is to provide a suspension system, in particular a driver's seat, of the kind described at the outset, so that axial loads on the actuating element can be avoided or at least reduced. Alternatively or additionally, a characteristic of the rotation speed in relation to the travel of the actuating element, which characteristic is as linear as possible, should be achieved. This should preferably be done using standardized elements as the actuating element.

According to the invention, the object is achieved by a suspension system having the features as claimed in claim 1 and also by a vehicle having the features as claimed in claim 15. Advantageous developments are described in the dependent claims.

Therefore, the present invention relates to a suspension system, preferably a driver's seat, comprising a first suspension part, preferably a frame of the driving seat, a second suspension part, preferably a seat surface of the driver's seat, wherein the two suspension parts are movable relative to one another in at least one first spatial direction, preferably in the height direction. The suspension system further has a kinematics system, preferably a scissor-type kinematics system, which is designed to connect the two suspension parts such that they are movable relative to one another at least in the first spatial direction.

The suspension system also has a spring device which is designed to support the static load of the second suspension part. In the case of the suspension system being implemented as a driver's seat, said static load can include the weight of a driver who is sitting on the second suspension part as the seat surface. The spring device is preferably also designed to passively damp relative movement of the two suspension parts in relation to one another. The spring device is preferably further or alternatively designed to define the vertical central position about which the suspension system is mounted such that it can vibrate. Furthermore, the spring device is preferably additionally or alternatively designed to perform a function which returns said suspension system to the central position. The spring device is preferably designed as an elastic spring arrangement, for example as a pneumatic spring or as a helical spring.

Furthermore, the suspension system has an actuating element which is designed to introduce a force bidirectionally between the two suspension parts and in this way to actively damp the relative movement of the two suspension parts in relation to one another. In other words, the movement of the second suspension part, such as a seat surface for example, is actively damped or actively isolated from the excitation on the first suspension part, such as cabin vibrations of a vehicle for example.

A suspension system of this kind can preferably be a driver's seat, but also any other suspension parts which are connected relative to one another in at least one first spatial direction and both have at least one passive and at least one active actuating element. This can be, for example, a worktop, a hospital bed, a vehicle cabin, a measuring device or the like.

The suspension system according to the invention is characterized in that the actuating element has a bearing arrangement, preferably a ball bearing, which is arranged within the force flow between the two suspension parts in such a way that an axial load can be at least partially, preferably entirely, kept away from the driving axis of the actuating element. This bearing arrangement can be of rigid or elastic design. This bearing arrangement is preferably arranged within the actuating element, as far as possible directly at that point at which the relative movement within the actuating element can take place.

This can result in the axial forces being absorbed by the bearing arrangement, so that said axial forces can be kept away from the rest of the actuating element and, in particular, from a motor of the actuating element which can form the driving axis of the actuating element. This can relieve loading from the rest of the actuating element and, in particular, a motor and also lead to a characteristic, which is as linear as possible, of the rotation speed in relation to the travel of the actuating element. This can also be implemented, for example when using a ball bearing, with a standardized element, and this can keep the costs of implementation low.

According to one aspect of the present invention, the actuating element has a motor, preferably an electric motor, a threaded nut, preferably a ball screw nut, and a spindle, wherein the motor is designed to drive the spindle, so that the threaded nut can be moved relative to the spindle, preferably in the first spatial direction, wherein the bearing arrangement is arranged between the motor and the spindle, wherein the motor is arranged on the first suspension part and the threaded nut is arranged on the second suspension part, or vice versa. The threaded nut can be designed as a ball screw nut, as a roller screw nut or as a sliding screw nut. The sliding screw nut can comprise metal and be designed with or without a coating.

This represents one possible way of implementing an actuating element using standard components and, in this way, capitalizing on the above-described advantages. A rotationally acting motor, as is customary in ball screw drives, is preferably used here. The use of an electric motor here is advantageous because electrical energy can usually be provided in a more simple and/or cleaner manner than, for example, pneumatic or hydraulic pressure. In this case, the arrangement of the bearing arrangement between the motor and the spindle ensures that the above-described advantages of decoupling the axial forces can be implemented.

Firstly, the motor and the spindle can be arranged on the first suspension part which, for example as the frame of a driver's seat, can be stationary in relation to the second suspension part which can be, for example, the seat surface of a driver's seat, to which seat surface the threaded nut can be connected. As a result, the motor, together with the spindle, can be arranged in a stationary manner on the frame, this usually being structurally more simple than the converse arrangement of these components. Secondly, the arrangement can also be performed conversely, so that the motor, together with the spindle, can move together with the seat surface of the driver's seat. This can increase the vibrating mass and in this way have a passive damping effect.

Here, the actuating element can be oriented so as to act in the first spatial direction in which the relative movement which is to be actively damped can also occur. This can cause force transmission which is as direct as possible. Alternatively, the actuating element can also be oriented so as to partially or entirely act in another spatial direction, such as so as to act perpendicularly in relation to the first spatial direction in particular, so that the relative movement between the two suspension parts can be achieved by means of a force transmission, for example by way of the kinematics system in the form of a scissor-type kinematics system. This can increase the design freedom for the suspension system.

According to a further aspect of the present invention, the motor and the spindle are arranged in such a way that the motor can directly drive the spindle, wherein the motor and the spindle have a common rotation axis which is preferably oriented in the first spatial direction. This can simplify the implementation.

According to a further aspect of the present invention, the actuating element is arranged outside the two suspension parts, preferably further parallel in relation to the two suspension parts. As a result, installation space and, in particular, installation height between the two suspension parts can be saved. Furthermore, the actuating element can be easier to access, for example for assembly, servicing, repair etc.

According to a further aspect of the present invention, the actuating element has a motor, preferably an electric motor, a threaded nut, preferably a ball screw nut, and a spindle, wherein the motor is designed to drive the spindle nut, so that the spindle can be moved relative to the threaded nut, preferably in the first spatial direction, wherein the bearing arrangement is arranged within the force flow between the motor and the threaded nut, wherein the motor is arranged on the first suspension part and the spindle is arranged on the second suspension part, or vice versa.

This represents a further possible way of implementing an actuating element using standard components and, in this way, capitalizing on the above-described advantages. In this case, the arrangement of the bearing arrangement between the motor and the threaded nut ensures that the above-described advantages of decoupling the axial forces can be implemented.

According to a further aspect of the present invention, the motor and the threaded nut are arranged in such a way that the motor can indirectly drive the threaded nut via a coupling element, preferably via a toothed belt, wherein the motor and the threaded nut have two different rotation axes which are preferably oriented parallel in relation to one another and particularly preferably further in the first spatial direction. An alternative implementation can be performed in this way.

According to a further aspect of the present invention, the actuating element is arranged between the two suspension parts, wherein the actuating element is preferably further designed to introduce the force bidirectionally between the two suspension parts in the first spatial direction. A compact arrangement can be created in this way, so that installation space outside the two suspension parts can be saved. The actuating element can also be protected in this way.

According to a further aspect of the present invention, the suspension system has an elastic damping element, preferably an elastomeric damping element, which is arranged between the spindle and the suspension part and is designed to passively damp the force flow. In this way, damping of high-frequency vibrations, of which the frequency is too high to be able to effectively actively damp said vibrations, can be achieved. The active damping can also be assisted and relieved of loading by the elastic damping element within the same force flow.

According to a further aspect of the present invention, the suspension system has a control unit which is designed to control the actuating drive in such a way that the relative movement of the two suspension parts in relation to one another can be actively damped. Active damping and, in particular, regulation can be implemented in this way.

According to a further aspect of the present invention, the suspension system has at least one position sensor which is designed to detect a position of the first suspension part relative to the second suspension part in at least the first spatial direction, or vice versa, wherein the position sensor is further designed to make the detected position available to the control unit. The position of one of the suspension parts relative to the other suspension part can be detected in this way, so that a relative movement, which can be actively counteracted, can be derived from the change in the detected position.

According to a further aspect of the present invention, the position sensor is designed to measure in absolute terms or in increments. An absolute position measurement has the advantage of being able to use the position as an absolute value immediately after operation of the suspension system begins. However, a sensor which measures in absolute terms is usually more expensive than a position sensor which measures in increments. However, this has the disadvantage, firstly, of having to be referenced, for example, in relation to an end position or in relation to a central position in order to be able to derive an absolute value from the relative measurement of the incremental sensor. The central position can be defined, for example, as the position of a load-free spindle since the static forces are absorbed by the spring device. In order to use an end position for referencing purposes, it would be possible, before use of the suspension system, to allow the actuating element to be driven into an end stop and to determine the position relative to this point.

According to a further aspect of the present invention, the suspension system has at least one acceleration sensor which is designed to detect an acceleration of the first suspension part relative to the second suspension part in at least one spatial direction, preferably in the first spatial direction, or vice versa, wherein the acceleration sensor is further designed to make the detected acceleration available to the control unit. In this way, the information relating to the acceleration can be used additionally or alternatively to an item of position information for implementing the active damping. In this case, the acceleration of the first suspension part, such as of the frame of a driver's seat for example, is preferably detected, so that vibrations can be kept away from the second suspension part, such as the seat surface of the driver's seat for example, by the active damping.

According to a further aspect of the present invention, the suspension system has a plurality of acceleration sensors which are designed to detect a plurality of accelerations of the first suspension part relative to the second suspension part in a plurality of spatial directions, preferably in three spatial directions which are oriented perpendicularly in relation to one another, particularly preferably in the depth direction, in the width direction and in the height direction, or vice versa, wherein the acceleration sensors are further designed to make the detected accelerations available to the control unit. In this way, for example for a driver's seat as the suspension system, the dynamics, for example of the driver's cabin, can be detected by detecting the translations in the depth direction, in the width direction and in the height direction and also by the respective rotations, so that an as it were "global" change in height of the seat surface of the driver's seat can be determined and actively adjusted as a result. This can improve the effect of the regulation and further increase the comfort etc. of the driver.

According to a further aspect of the present invention, the suspension system has at least one shifting device, preferably at least one horizontal shifting device, particularly preferably at least one horizontal rail system, which is designed so that the second suspension part can be shifted relative to the kinematics system in a second spatial direction, preferably in the depth direction, and/or the kinematics system can be shifted relative to the first suspension part in a second spatial direction, preferably in the depth direction, and/or the first suspension part can be shifted relative to a substrate in a second spatial direction, preferably in the depth direction.

In this way, for example in the case of a driver's seat, the comfort of the driver can be further increased by way of, for example, the distance of the seat surface of the driver's seat from the steering wheel being able to be changed. This relative mobility, for example in the depth direction, can be implemented, in this case, depending on the embodiment of the driver's seat, at the above-described different points between the seat surface and the body of the vehicle.

The present invention also relates to a vehicle comprising a suspension system as described above. As a result, the above-described properties and advantages can be implemented in a vehicle such as in trucks, in buses etc. for example. This can be done at different points within the vehicle at which excitations, for example from the carriageway into the vehicle or within the vehicle, are to be actively damped. The suspension system can preferably be a driver's seat, so that the above-described properties and advantages can be used for increasing the comfort of the driver in a vehicle.

A plurality of exemplary embodiments and further advantages of the invention will be explained below in conjunction with the following figures, in which.

The description of the abovementioned figures is given in Cartesian coordinates with a longitudinal direction X, a transverse direction Y which is oriented perpendicularly in relation to the longitudinal direction X, and a vertical direction Z which is oriented perpendicularly both in relation to the longitudinal direction X and also in relation to the transverse direction Y. The longitudinal direction X can also be referred to as the depth direction X, the transverse direction Y can also be referred to as the width direction Y, and the vertical direction Z can also be referred to as the height direction Z.

Figure 1:
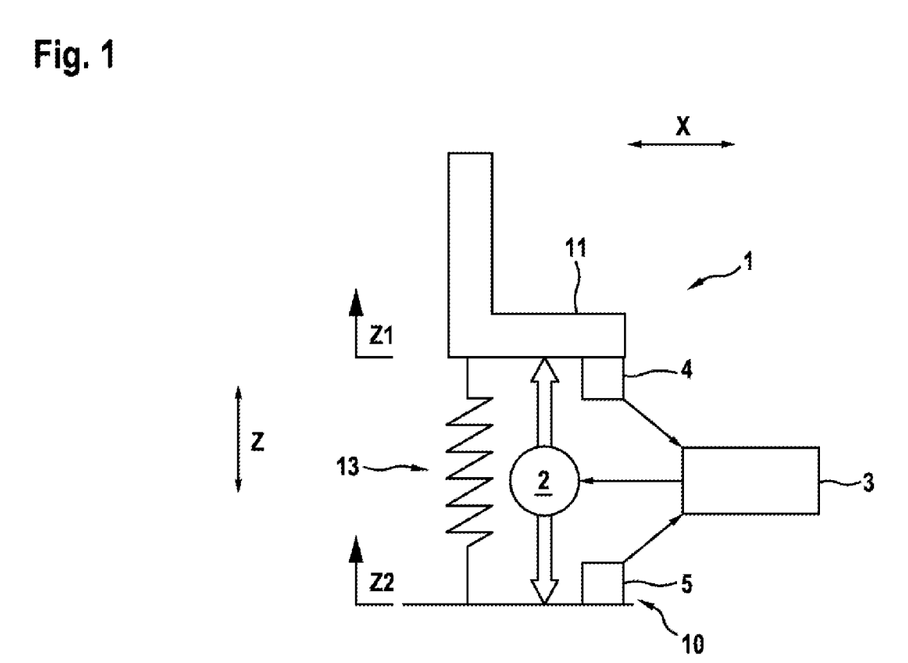
FIG. 1 shows a schematic basic illustration of passive and active damping of a suspension system in the form of a driver's seat.

FIG. 1 shows a schematic basic illustration of passive and active damping of a suspension system 1 in the form of a driver's seat 1. The driver's seat 1 has a frame 10 as a first stationary suspension part 10, and a seat surface 11 as a second moving suspension part 11, wherein "stationary" and "moving" are to be understood relative to one another. The seat surface 11 is arranged above the frame 11 in the height direction Z and is connected to said frame by a kinematics system 12 in the form of a scissor-type kinematics system 12. The scissor-type kinematics system 12 is oriented in such a way that the two pairs of half-scissors can move in the depth direction X, so that the seat surface 11 can be raised or lowered in relation to the frame 10 in the height direction Z. A spring device 13 in the form of an elastic spring arrangement 13, which is designed as a pneumatic spring 13, is further arranged between the seat surface 11 and the frame 10 and also between the pair of half-scissors of the scissor-type kinematics system 12. The pneumatic spring 13 serves to absorb the static forces from the seat surface 11 onto the frame 10 and is able to insulate vibrations from the frame 10 in the direction of the seat surface 11 to a specific extent and also within a low-frequency vibration range. Furthermore, the pneumatic spring 13 has a restoring effect on the relative movement in the event of a deflection out of the central position and therefore assumes the desired central position in the medium term.

In order to improve the damping, an actuating element 2 is further provided, which actuating element is arranged parallel in relation to the pneumatic spring 13 and can act either directly or indirectly by means of the scissor-type kinematics system 12 in the height direction Z. Vibrations which can be transmitted from the frame 10 to the seat surface 11 can additionally be actively damped in this way. To this end, the actuating element 2 is actuated and regulated by a control unit 3. In order to be able to execute a regulation operation, a position sensor 4 is provided, which position sensor is arranged on the seat surface 11 in such a way that the position sensor 4 can detect a vertical position Z1 of the seat surface 11 relative to a vertical position Z2 of the frame 10. A movement of the seat surface 11 relative to the frame 10 can also be deduced from this position Z1 or from the change in the position Z1, and the speed of the relative movement can also be determined from the extent of the change in position. The frame 10 of the driver's seat 1 further has an acceleration sensor 5 which can detect the acceleration of the frame 10 in the height direction Z, so that this information can also be taken into account in the regulation of the control unit 3.

Figure 2:
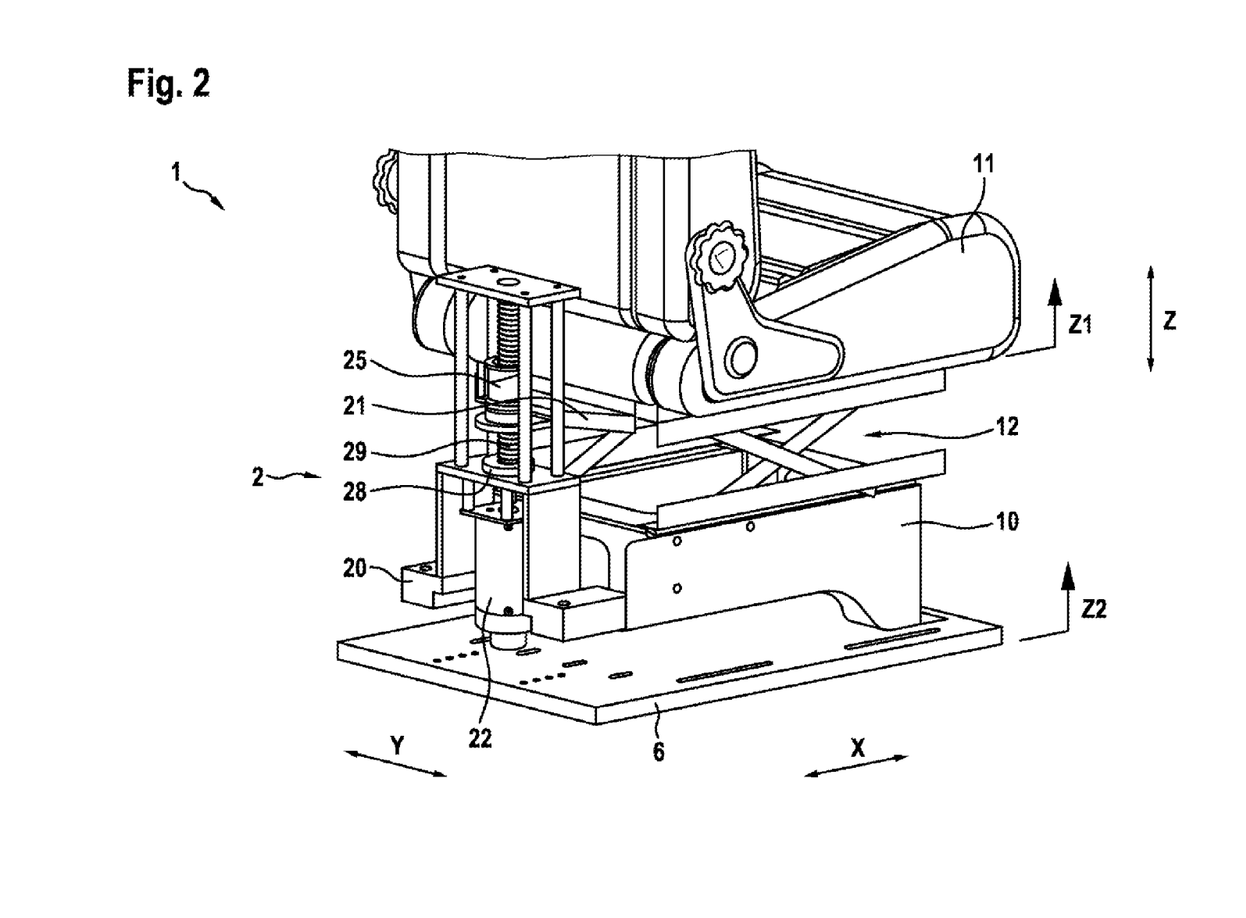
FIG. 2 shows a schematic perspective illustration of a suspension system according to the invention in the form of a driver's seat in a first embodiment.

FIG. 2 shows a schematic perspective illustration of a suspension system 1 according to the invention in the form of a driver's seat 1 in a first embodiment. The actuating element 2 has a first actuating element holder 20 by way of which the actuating element 2 is mounted in a stationary manner on the frame 10 on one side. The frame 10 is, for its part, arranged in a stationary manner on a substrate 6, such as the body 6 of a vehicle in this case. The actuating element 2 further has a second actuating element holder 21 by way of which the actuating element 2 is mounted in a stationary manner on the seat surface 11 on the other side. In this case, the actuating element 2 is mounted on the frame 10 and on the seat surface 11 from the rear in the depth direction X, so that the actuating element 2 can be used and, in particular retrofitted, in this embodiment, without having to change the structure of the driver's seat 1 itself.

An electric motor 22 is mounted in a stationary manner on the first actuating element holder 20 of the frame 10 and is connected to a spindle 29 of a ball screw drive in such a way that the electric motor 22 can directly rotationally drive the spindle 29. To this end, the electric motor 22 and the spindle 29 have a common rotation axis which is oriented in the height direction Z and, in this exemplary embodiment, represents the driving axis of the actuating element 2. As the ball screw nut 25 of the ball screw drive, a threaded nut 25 is arranged on the spindle 29 and is connected in a stationary manner to the second actuating element holder 21. If the spindle 29 is now rotationally driven by means of the electric motor 22, the seat surface 11 can be moved relative to the frame 10 in the height direction Z by means of the movement of the ball screw nut 25, so that active damping of vibrations can be implemented.

In this case, the spindle 29 is mounted in a rotationally rotatable manner directly on the first actuating element holder 20 by means of a bearing arrangement 28 in the form of a ball bearing 28, so that the spindle 29 can execute the rotational movement of the electric motor 22, but at the same time axial forces can be absorbed by the seat surface 10 from the ball bearing 28 and therefore can be kept away from the electric motor 22. This can relieve the electric motor 22 of loading and protect said electric motor. Owing to the use of a ball screw drive, a linear characteristic can further be achieved between the rotation speed of the electric motor 22 in relation to the travel of the actuating element 2 in the height direction Z, and this can improve the accuracy of regulation and therefore increase the quality and the efficacy of the vibration damping in relation to known active damping operations of driver's seats 1. Owing to the use of a ball screw drive, this can further be achieved by standardized elements, such as the electric motor 22, the spindle 29 and the ball screw nut 25, in combination with a ball bearing 28, and this can simplify the implementation and keep the costs of implementation of this advantage low.

Figure 3:
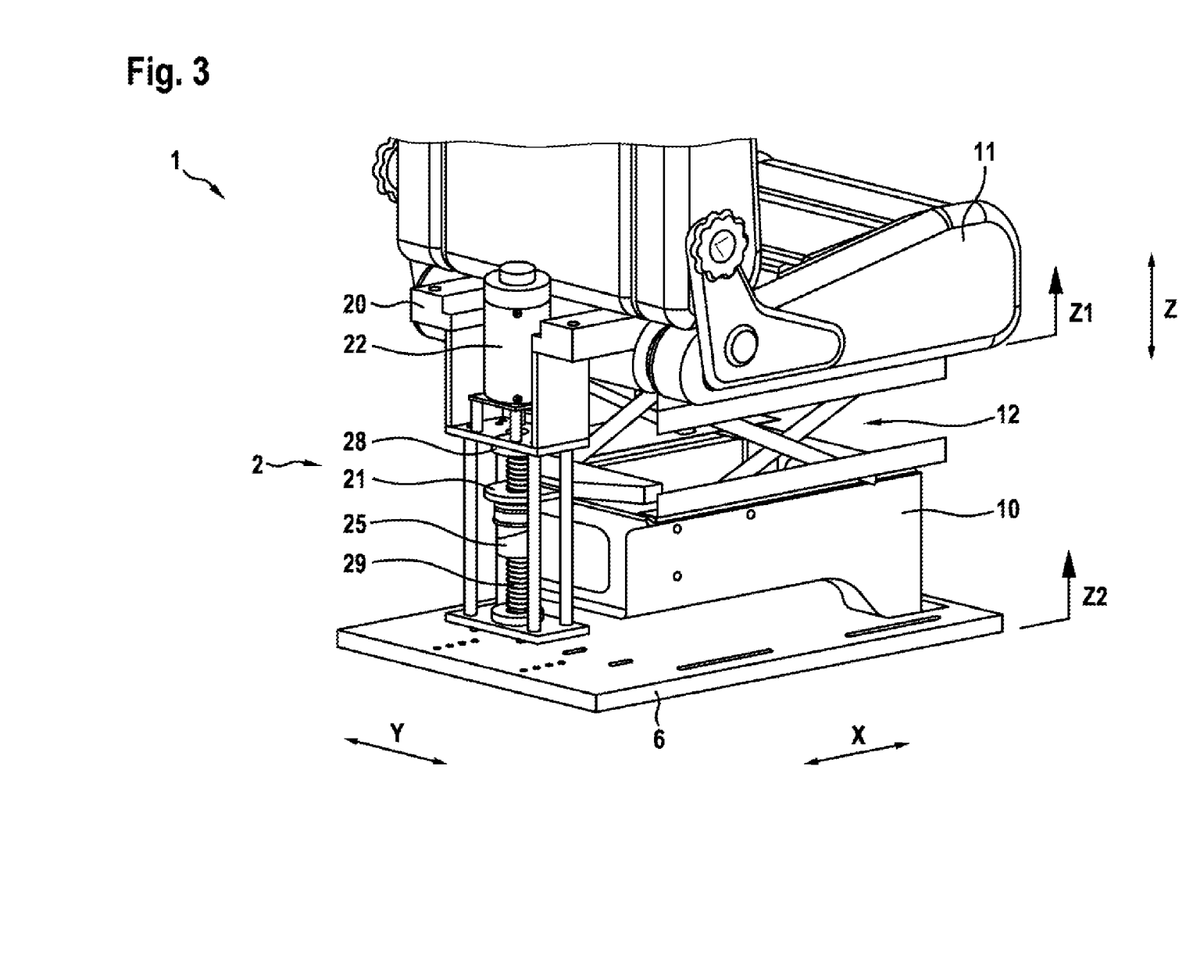
FIG. 3 shows a schematic perspective illustration of a suspension system according to the invention in the form of a driver's seat in a second embodiment.

FIG. 3 shows a schematic perspective illustration of a suspension system 1 according to the invention in the form of a driver's seat 1 in a second embodiment. This second embodiment differs from the first embodiment only in that, in this case, the electric motor 22 with the spindle 29 is mounted in a stationary manner on the seat surface 11 by means of the first actuating element holder 20, and the ball screw nut 25 is mounted in a stationary manner on the frame 10 by means of the second actuating element holder 21. The same properties as in the first exemplary embodiment can be achieved in this way. The mass of the seat surface 11 to be damped can further be increased, and this can have a vibration damping effect.

Figure 4:
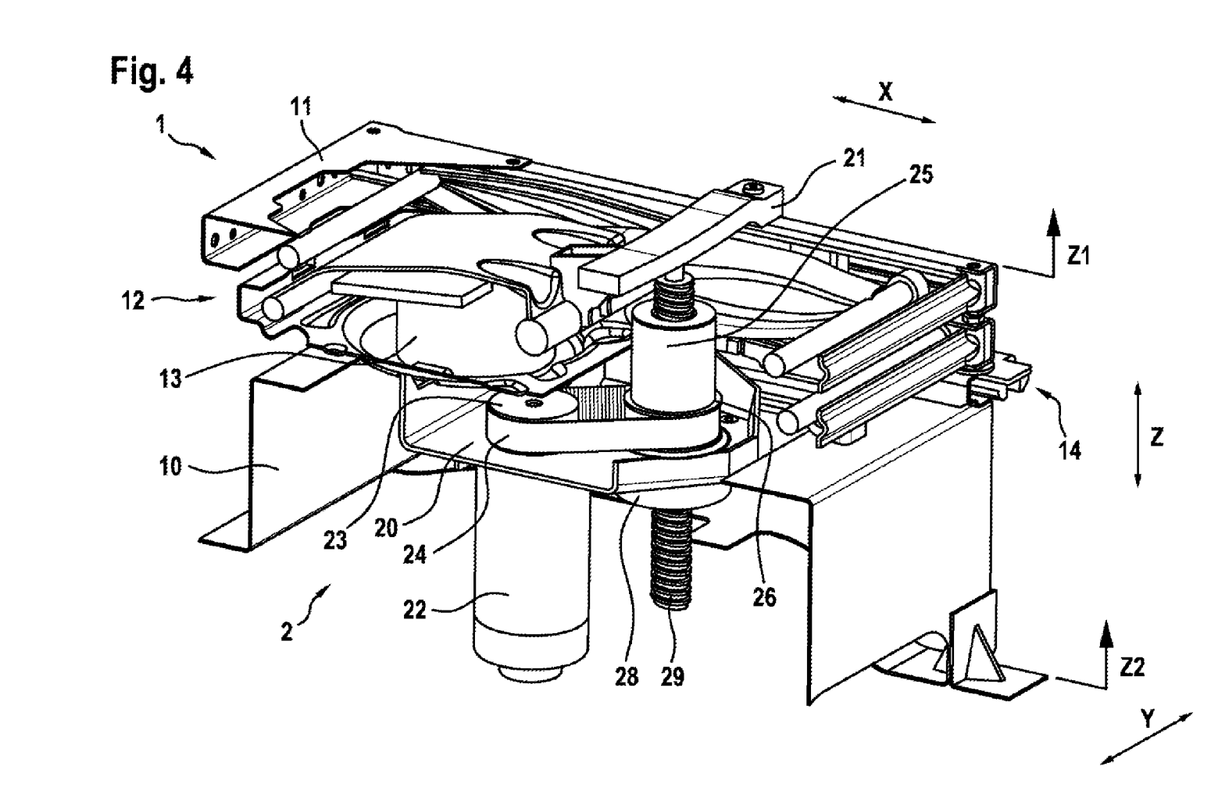
FIG. 4 shows a schematic perspective sectional illustration of a suspension system according to the invention in the form of a driver's seat in a third embodiment.
Figure 5:
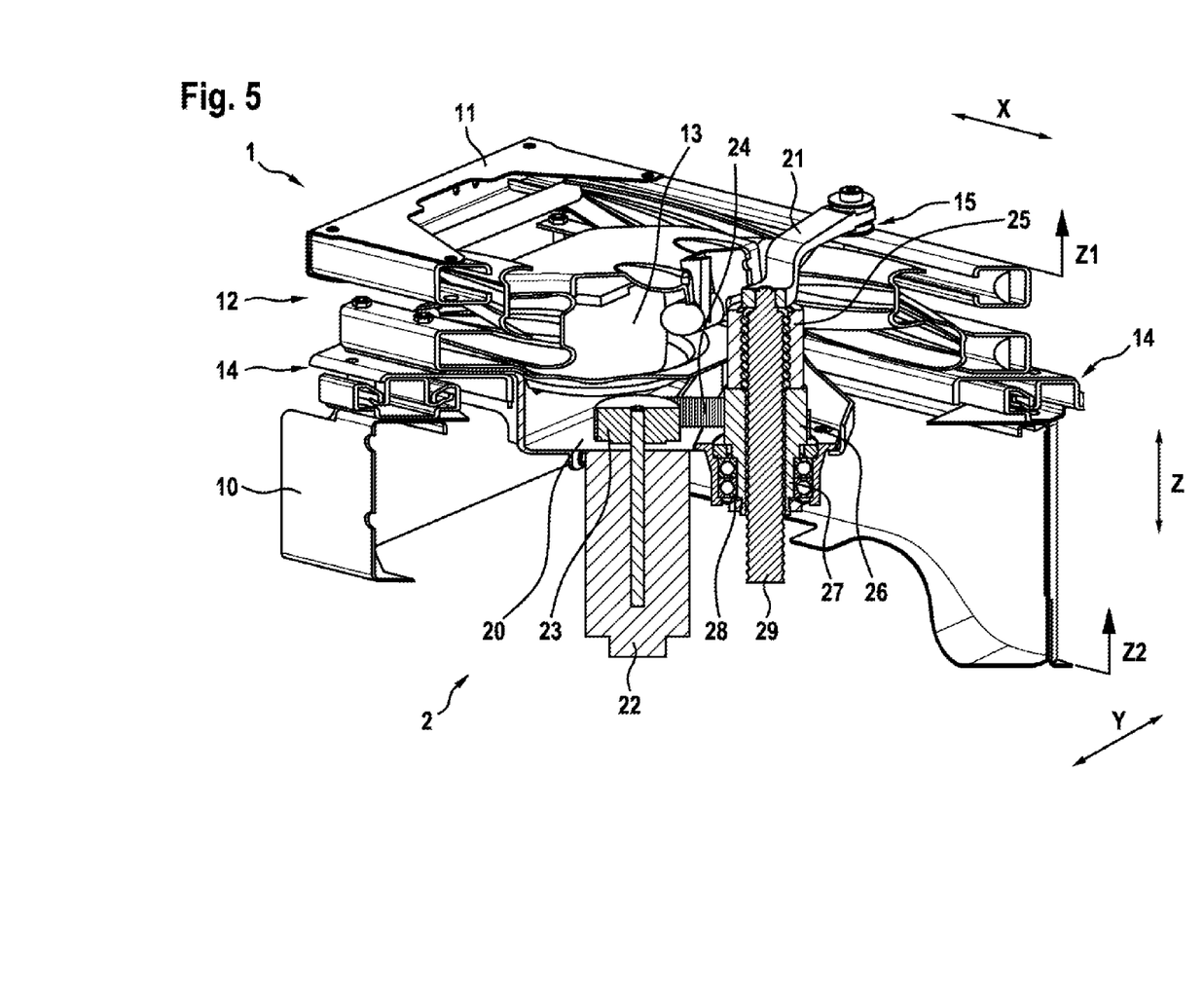
FIG. 5 shows a schematic perspective sectional illustration of a suspension system according to the invention in the form of a driver's seat in a fourth embodiment.

FIG. 4 shows a schematic perspective sectional illustration of a suspension system 1 according to the invention in the form of a driver's seat 1 in a third embodiment. FIG. 5 shows a schematic perspective sectional illustration of a suspension system 1 according to the invention in the form of a driver's seat 1 in a fourth embodiment.

In both of these exemplary embodiments, the actuating element 2 is arranged between the frame 10 and the seat surface 11 in the height direction Z, so that no installation space has to be used for the actuating element outside the basic dimensions of the driver's seat 1. At the same time, the electric motor 22 and the spindle 29 are arranged next to one another in order to achieve as large a stroke as possible between the frame 10 and the seat surface 11 in the height direction Z. The driving axis of the actuating element 2, which corresponds to the axis of the motor 22, is therefore arranged parallel in relation to the axis of the spindle 29 in both of these exemplary embodiments. The electric motor 22 is connected in a stationary manner to the lower region of the scissor-type kinematics system 12 by means of a first actuating element holder 20 in the form of a trough 20, and is arranged approximately below the pneumatic spring 13. At its upper end, the electric motor 22 has a toothed disk 23 which can be rotationally driven by the electric motor 22.

In both of these exemplary embodiments, the ball screw nut 25 is arranged on the first actuating element holder 20, that is to say on the trough 20, parallel in relation to the electric motor 22 and offset in relation to said electric motor in the depth direction X. In this case, the ball screw nut 25 is connected in a stationary manner to a hollow shaft 27 and arranged above the hollow shaft 27 in the height direction Z. The hollow shaft 27 is connected in a rotationally rotatable manner to the trough 20 via the ball bearing 28, so that, in both of these exemplary embodiments, axial forces which can act on the ball screw nut 25 can be absorbed by the trough 20 via the ball bearing 28. A toothed disk 26 of the hollow shaft 27 is arranged in a stationary manner around the hollow shaft 27. The two number disks 23, 26 are connected by means of a toothed belt 24 as a coupling element 24, so that a rotational movement of the electric motor 22 can be rotationally transmitted to the ball screw nut 25 via the toothed belt 24.

The spindle 29 is arranged within the ball screw nut 25, so that the spindle 29 can be raised and lowered in the height direction Z by the rotation of the ball screw nut 25. Here, in the third exemplary embodiment of FIG. 4, the spindle 29 is rigidly connected to the seat surface 11 via the second actuating element holder 21 in the form of a bracket 21. In the fourth exemplary embodiment of FIG. 5, an elastic damping element 15 in the form of an elastomeric damping element 15 is arranged between the bracket 21 and the seat surface 11 in order to provide passive damping at this point too.

In the third and fourth exemplary embodiments of FIGS. 4 and, respectively, 5, a horizontal shifting device 14 in the form of a horizontal rail system 14 is in each case provided between the scissor-type kinematics system 12 and the frame 10, so that the seat surface 11, together with the scissor-type kinematics system 12 and the actuating element 2, can be moved relative to the frame 10 in the depth direction X. A driver can adjust the driver's seat 1 relative to the steering wheel in this way.

LIST OF REFERENCE SYMBOLS (PART OF THE DESCRIPTION)

X Longitudinal direction; depth; second spatial direction
Y Transverse direction; width
Z Vertical direction; height; first spatial direction
Z1 Vertical movement direction of the moving suspension part 11
Z2 Vertical movement direction of the stationary suspension part 10
1 Suspension system; driver's seat
10 First suspension part; stationary suspension part; frame of the driver's seat 1
11 Second suspension part; moving suspension part; seat surface of the driver's seat 1
12 (Scissor-type) kinematics system
13 Spring device; elastic spring arrangement; pneumatic spring; helical spring
14 (Horizontal) shifting device; (horizontal) rail system
15 Elastic damping element; elastomeric damping element
2 Actuating element
20 First actuating element holder; trough
21 Second actuating element holder; bracket
22 (Electric) motor
23 Toothed disk of the motor 22
24 Coupling element; toothed belt
25 Threaded nut; ball screw nut
26 Toothed disk of the hollow shaft 27
27 Hollow shaft
28 Bearing arrangement; ball bearing
29 Spindle
3 Control unit
4 Position sensor
5 Acceleration sensor
6 Substrate; body; chassis

The invention claimed is:

1. A suspension system for a driving seat, comprising
a frame of the driving seat,
a seat surface of the driving seat,
wherein the frame and the seat surface are movable relative to one another in a height direction (Z),
a scissor-type kinematics system, designed to connect the frame and the seat surface such that they are movable relative to one another at least in the height direction (Z),
a spring device to support a static load of the seat surface, and
an actuating element which is designed to introduce a force flow bidirectionally between the frame and the seat surface to actively damp relative movement of the frame and the seat surface in relation to one another,
wherein the actuating element has a ball bearing, which is arranged within the force flow between the frame and the seat surface in such a way that an axial load can be at least partially kept away from a driving axis of the actuating element.

2. The suspension system as claimed in claim 1, wherein the actuating element has an electric motor, a nut, and a spindle,
wherein the motor is designed to drive the spindle, so that the nut can be moved relative to the spindle in the height direction,
wherein the bearing arrangement is arranged between the motor and the spindle,
wherein the motor is arranged on one of the frame and the seat surface and the threaded nut is arranged on the other of the frame and the seat surface.

3. The suspension system as claimed in claim 2, wherein motor can directly drive the spindle and the motor and the spindle have a common rotation axis oriented in the height direction.

4. The suspension system as claimed in claim 2, wherein the actuating element is arranged outside the frame and the seat surface.

5. The suspension system as claimed in claim 1, wherein the actuating element has a motor, a threaded nut, and a spindle, and wherein the motor is designed to drive the threaded nut to move the spindle relative to the threaded nut,
wherein the bearing arrangement is arranged within the force flow between the motor and the threaded nut,
wherein the motor is arranged on one of the frame and the seat surface.

6. The suspension system as claimed in claim 5, wherein the motor and the threaded nut are arranged in such a way that the motor can indirectly drive the threaded nut via a coupling element of a toothed belt and the motor and the threaded nut have two different rotation axes which are oriented parallel in relation to one another.

7. The suspension system as claimed in claim 5, wherein the actuating element is arranged between the frame and the seat surface and wherein the actuating element is further designed to introduce the force bidirectionally between the frame and the seat surface in the height direction.

8. The suspension system as claimed claim 5, wherein an elastic damping element is arranged between the spindle and the frame and the seat surface and the elastic damping element is designed to passively damp the force flow.

9. The suspension system as claimed in claim 1, further comprising:
a control unit designed to control an actuating drive to actively damp the relative movement of the frame and the seat surface.

10. The suspension system as claimed in claim 9, further comprising
at least one position sensor to detect a position of the frame relative to the seat surface and make the detected position available to the control unit.

11. The suspension system as claimed in claim 10, wherein
the position sensor is designed to measure in absolute terms or in increments.

12. The suspension system as claimed in claim 9, further comprising:
at least one acceleration sensor designed to detect an acceleration of the frame relative to the seat surface and to make the detected acceleration available to the control unit.

13. The suspension system as claimed in claim 9, further comprising:
a plurality of acceleration sensors designed to detect a plurality of accelerations of the frame relative to the seat surface in a plurality of spatial directions (X, Y, Z) which are oriented perpendicularly in relation to one another,
wherein the acceleration sensors are further designed to make the detected accelerations available to the control unit.

14. The suspension system as claimed in claim 1, further comprising
a horizontal rail system that operates as a shifting device, the horizontal rail system designed to shift the seat surface relative to a kinematics system in a second spatial direction (X), wherein the kinematics system is a scissor-type kinematics system.

15. A vehicle comprising:
a suspension system for a driving seat, the suspension system including:
a frame and a seat surface moveable relative to one another in a direction;
a scissor-type kinematics system to connect the frame and the seat surface,
a spring device to support a static load of the seat surface,
an actuating element to introduce a force flow bidirectionally between the frame and the seat surface to actively damp relative movement of the frame and the seat surface in relation to one another; and
wherein the actuating element has a ball bearing arranged within the force flow between the frame and the seat surface to at least partially keep away an axial load from a driving axis of the actuating element.

16. A vehicle comprising:
a suspension system for a driving seat, the suspension system including:
a frame and a seat surface moveable relative to one another in a direction;
a scissor-type kinematics system to connect the frame and the seat surface,
a spring device to support a static load of the seat surface,
an actuating element to introduce a force flow bidirectionally between the frame and the seat surface to actively damp relative movement of the frame and the seat surface in relation to one another; and
wherein the actuating element has an electric motor, a nut, and a spindle and the motor is designed to drive the spindle to move the nut relative to the spindle.

* * * * *